(12) United States Patent
Azar et al.

(10) Patent No.: US 9,483,845 B2
(45) Date of Patent: Nov. 1, 2016

(54) EXTENDING PREDICTION MODES AND PERFORMANCE OF VIDEO CODECS

(71) Applicant: Nvidia Corporation, Santa Clara, CA (US)

(72) Inventors: Hassane S Azar, Santa Clara, CA (US);
Dawid Pajak, Santa Clara, CA (US);
Stefan Eckart, Munich (DE); Swagat Mohapatra, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 637 days.

(21) Appl. No.: 13/871,180

(22) Filed: Apr. 26, 2013

(65) Prior Publication Data
US 2014/0321757 A1 Oct. 30, 2014

(51) Int. Cl.
*G06T 9/00* (2006.01)
*H04N 19/61* (2014.01)
*H04N 19/20* (2014.01)
*H04N 19/54* (2014.01)

(52) U.S. Cl.
CPC .............. *G06T 9/00* (2013.01); *G06T 9/001* (2013.01); *H04N 19/20* (2014.11); *H04N 19/54* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 6,151,636 A * | 11/2000 | Schuster | .................. | H04L 1/004 709/231 |
| 2003/0133020 A1 * | 7/2003 | Suh | ....................... | G06T 3/4038 348/218.1 |
| 2011/0206124 A1 | 8/2011 | Morphet et al. | | |

FOREIGN PATENT DOCUMENTS

WO    2012122364 A1    9/2012

OTHER PUBLICATIONS

Merkle, P., et al., "Video Plus Depth Compression for Mobile 3D Services," 3DTV Conference: The True Vision-Capture, Transmission and Display of 3D Video, May 2009, 4 pages.
Lee, C., et al., "A Framework of 3D Video Coding Using View Synthesis Prediction," Picture Coding Symposium (PCS), May 2012, Krakow, Poland, 4 pages.
"Motion Compensation," Online Bibliothek Wikipedia, http://en.wikipedia.org/w/index.php?title=Motion_compensation &oldid=548689040, changed last on Apr. 4, 2013, 6 pages.
Translation of German Office Action dated Mar. 5, 2014, 4 pages.

* cited by examiner

*Primary Examiner* — Said Broome

(57) ABSTRACT

A video frame compression system includes a rendering engine that provides a current video frame and current additional rendering information. Additionally, the video frame compression system includes a warping engine that generates a warped video frame, wherein the warped video frame is a transformation of a previous video frame that is based on the current additional rendering information. Further, the video frame compression system includes a video encoder that compresses the current video frame by using the warped video frame as a reference frame and separately compresses the current additional rendering information. Still further, the video frame compression system includes a packetizer that provides main and auxiliary data streams corresponding to the compressed current video frame and the compressed current additional rendering information, respectively. A video frame decompression system and methods of video frame compression and decompression are also provided.

17 Claims, 3 Drawing Sheets

EXTENDING PREDICTION MODES AND PERFORMANCE OF VIDEO CODECS

TECHNICAL FIELD

This application is directed, in general, to encoding and decoding of network transmissions, and more specifically, to video frame compression and decompression systems and methods of video frame compression and decompression.

BACKGROUND

A video codec is a device or software that enables compression or decompression of digital video (i.e., a digital data stream). Many current video codecs operate on an assumption that the encoded data represents natural or real-world scenes, which are sampled both spatially and temporally. Such scenes present a variety of illumination conditions and may contain multiple objects, each having its own shape and texture. However, these signals in each video frame are usually continuous and follow certain patterns, like a specific power spectrum shape or color distribution. Additionally, since frames may be captured at relatively high speeds, the amount of information introduced in a new video frame is usually small and results from camera or object motion. This spatial and temporal redundancy is exploited by all state-of-the-art video encoders that try to predict a current video frame and encode only the data that cannot be derived from a spatial or temporal neighborhood. Encoding only a difference between the current video frame and its prediction, together with the selected prediction mode, provides significant reduction in bandwidth and storage requirements for the output video stream. Further improvements in video frame prediction would be beneficial to the art.

SUMMARY

Embodiments of the present disclosure provide video frame compression and decompression systems and methods of video frame compression and decompression.

In one embodiment, the video frame compression system includes a rendering engine that provides a current video frame and current additional rendering information. Additionally, the video frame compression system includes a warping engine that generates a warped video frame, wherein the warped video frame is a transformation of a previous video frame that is based on the current additional rendering information. Further, the video frame compression system includes a video encoder that compresses the current video frame by using the warped video frame as a reference frame and separately compresses the current additional rendering information. Still further, the video frame compression system includes a packetizer that provides main and auxiliary data streams corresponding to the compressed current video frame and the compressed current additional rendering information, respectively.

In one aspect, the method of video frame compression includes providing a current video frame and current additional rendering information. The method of video frame compression also includes generating a warped video frame, wherein the warped video frame is a transformation of a previous video frame that is based on the current additional rendering information. The method of video frame compression further includes compressing the current video frame by using the warped video frame as a reference frame and separately compressing the current additional rendering information. The method of video frame compression still further includes packetizing the compressed current video frame and the compressed additional rendering information into main and auxiliary data streams, respectively.

In another embodiment, the video frame decompression system includes a depacketizer that provides a compressed current video frame and compressed additional rendering information. Additionally, the video frame decompression system includes an auxiliary video decoder that decodes the compressed additional rendering information to provide current additional rendering information. Further, the video frame decompression system includes a warping engine that reconstructs a warped video frame, wherein the warped video frame is a transformation of a previous video frame that is based on the current additional rendering information. Still further, the video frame decompression system includes a main video decoder that decodes the compressed current video frame by using the warped video frame as a reference frame to provide a current video frame.

In another aspect, the method of video frame decompression includes depacketizing a compressed current video frame and compressed additional rendering information. The method of video frame decompression also includes decoding the compressed additional rendering information to provide current additional rendering information. The method of video frame decompression further includes reconstructing a warped video frame, wherein the warped video frame is a transformation of a previous video frame that is based on the current additional rendering information. The method of video frame decompression still further includes decoding the compressed current video frame by using the warped video frame as a reference frame to provide a current video frame.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Figure 1:
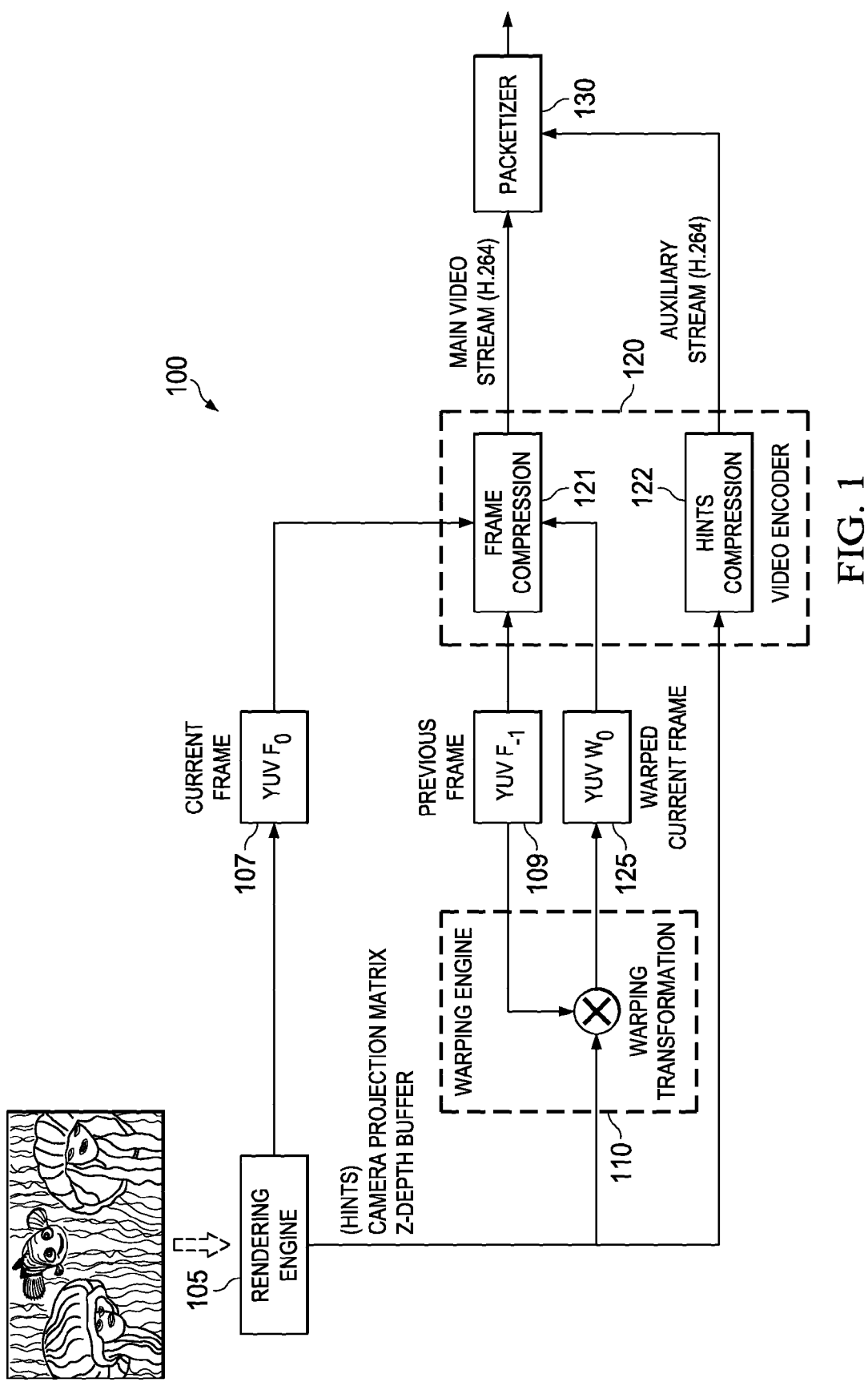
FIG. 1 illustrates a block diagram of an embodiment of a video frame compression system constructed according to the principles of the present disclosure.

Video games and three dimensional (3D) applications usually build entire video scenes by rendering triangles for display on a video screen. What is seen on the video screen is actually a projection of a 3D geometry. Each pixel on the screen employs a depth coordinate (i.e., a z-depth coordinate) that indicates a corresponding relative scene depth for the pixel, which also has a horizontal and vertical (x and y) pixel location coordinate on the video screen. Both the pixel location and its z-depth information are employed to create a 3D presentation of the video scene on a two dimensional screen. This z-depth coordinate information is readily available as a result of rendering a video scene. Additionally, camera projection information resulting from camera motion (requiring a new camera position or location) is also readily available from a rendering operation.

Prediction modes are employed by a video encoder and typically provide a tradeoff between computational complexity and compression efficiency. They work well for input frame streams with various signal characteristics, but for input sequences synthesized with computer graphics methods (e.g., through rasterization or ray tracing), better predictions of a current frame can be provide. However, standard encoder frameworks do not include facilities for providing external prediction images to the encoder. Embodiments of the present disclosure address this problem and present a simple and powerful approach for extending a prediction modes list for codecs. The proposed approach is complemented with a prediction mode tuned specifically for GPU rendered content. This novel prediction mode can be quickly computed on a GPU and improves the compression rates of a final bit-stream.

Here, a key idea is to provide an additional, GPU-rendered prediction image as one of the reference frames in a reference frame list. This supplemental image may be constructed outside the video coding framework (e.g., at an application level) using data available to both encoder and decoder. As with regular prediction modes, both encoder and decoder have to be synchronized and receive the same prediction image in order to code and decode an artifact-free frame.

Overall, it is expected that the data transmitted over a network with this technique, including a new video stream and an auxiliary stream, will be smaller than an original video stream from a regular (naïve) compression technique. Transferring less data over the network translates to lower overall latency (thereby providing a better experience for cloud gaming, for example), lower cost (corresponding to fewer transmission bits required), and more clients that may be served at once.

A "hint" is generally defined in the present disclosure as additional information available to a prediction or encoding process. This additional information can usually be provided by a rendering engine and often in lower level software (e.g., software that is controlling a compression engine of a video encoder). This additional information allows the video encoder to do a better job at encoding, thereby providing an improvement in image quality, a reduction in latency time or a reduction in the number of bits needed to allocate the scene, as already noted.

"Warping" a video frame is generally defined in the present disclosure as transforming an existing video image or frame. The warping operation usually maps positions in one image plane to positions in another image plane. Typically, in the present disclosure, a warped video frame is a transformed previous video frame that employs additional information (i.e., at least one hint) in providing the transformation. As noted, these hints are available from the rendering process or a rendering engine. For example, as a camera position changes, this warping transformation is attempting to predict, on a per pixel basis, the effect on and condition of each new pixel.

Therefore, embodiments of the present disclosure encompass the core idea of using hints in creating a warped frame, which may then be employed as a reference video frame for a video encoder. In so doing, an existing video encoder architecture may be employed, since only another reference frame is being added for use by the video encoder. Although decoding of the additional information is required at a client decoder, existing video decoders may also be employed. In one example, embodiments of the present disclosure accommodate use of unmodified encoders and decoders that are compliant with the H.264/AVC Video Coding Standard.

FIG. 1 illustrates a block diagram of an embodiment of a video frame compression system, generally designated 100, constructed according to the principles of the present disclosure. The video compression system 100 includes a rendering engine 105, a warping engine 110, a video encoder 120 and a packetizer 130.

The rendering engine 105 provides a current video frame 107 to a frame compression portion 121 of the video encoder 120. The rendering engine 105 also provides current additional rendering information (i.e., hints) to the warping engine 110 and to a hints compression portion 122 of the video encoder 120, as shown. The video encoder 120 provides a main video stream containing a frame compression of the current video frame 107 and an auxiliary stream containing a compression of the current additional rendering information to the packetizer 130 for network transmission.

In the illustrated embodiment of FIG. 1, the video encoder 120 is compliant with the H.264/AVC Video Coding Standard, which accommodates the main video stream and the auxiliary stream as well as supporting multiple reference frame evaluation, where encoder parameters for each reference frame employed are adjusted to improve accuracy and performance. In another embodiment, the video encoder 120 may encode Z-depth information, which represents the majority of the auxiliary stream, together with color frame in a combined color+depth encoding mode. In generally, embodiments of the present disclosure may accommodate frame compression and hints compression in other existing or future-developed video encoding structures wherein these compression functions may be either separate or combined.

The warping engine 110 generates a warped video frame 125 through a warping transformation of a previous video frame 109, where the warping transformation is based on the current additional rendering information supplied by the rendering engine 105. The warped video frame 110 is employed by the frame compression portion 121 of the video encoder 120 as a reference frame for compressing the current video frame 107.

Generally, the video compression system 100 illustrates a process on a server side that creates and employs the new reference frame (i.e., the warped current frame 125). For the server side, the warped current frame 125 allows the video encoder 120 to do an improved job of frame prediction, since it precisely reflects the current frame 107 in the best case. For example, for the case of only global motion, the warped frame 125 will look exactly like the current frame 107.

In the illustrated example, the current additional rendering information supplied from the rendering engine 105 include a camera projection matrix and Z-depth buffer information, which correspond to external motion vector hints. The term "motion vector hint" corresponds to a translation vector with respect to a current macroblock position. In frame situations having no or small amounts of object motion, use of these external motion vector hints in providing the new reference frame allows a zero or near zero motion search.

The video encoder 120 has the ability to accept hints from the outside instructing it to try a motion vector provided through the motion vector hints that corresponds to a location in a reference frame. This process replaces searching for the motion vector that will give the fewest number of bits to encode a macroblock or that will give a match for the macroblock. For example, from a current macroblock position a shift may be needed of some number of pixels in a particular direction to find a macroblock that looks close to a current macroblock.

Use of the new reference frame is part of a temporal framework and is also part of an epic framework of spatial and temporal prediction that provides prediction improvement while allowing a prediction time reduction. The prediction improvement typically provides a compression having a smaller residual of the current frame 107 thereby requiring fewer encoding bits.

Decoding the network transmission on a client side has also been considered, since the warped current frame 125 needs to be reconstructed there. This requires the same information that was used to construct the warped frame 125, which is the camera projection and Z-depth information, in this example, along with the previous video frame 109.

Figure 2:
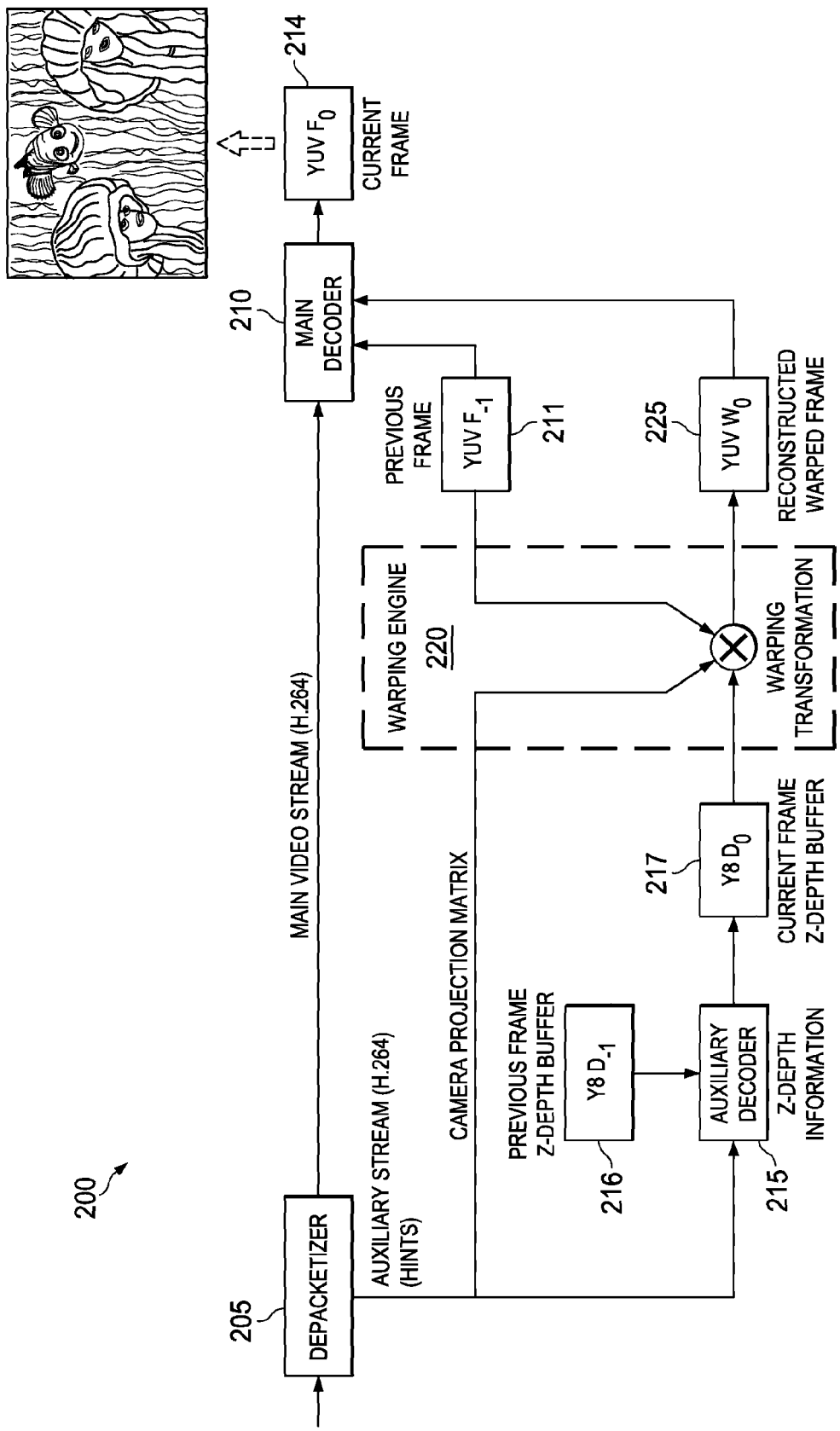
FIG. 2 illustrates a block diagram of an embodiment of a video frame decompression system constructed according to the principles of the present disclosure.

FIG. 2 illustrates a block diagram of an embodiment of a video frame decompression system, generally designated 200, constructed according to the principles of the present disclosure. The video frame decompression system 200 includes a depacketizer 205, a main decoder 210, an auxiliary decoder 215 and a warping engine 220.

The depacketizer 205 receives a network transmission from a video frame compression system, such as the video frame compression system 100 of FIG. 1, and provides a main video stream corresponding to a compressed residual frame of a current video frame 214. The depacketizer 205 also provides an auxiliary data stream corresponding to compressed current additional rendering information (i.e., the hints sent from the server side) as also discussed with respect to FIG. 1.

A Z-depth portion of the compressed current additional rendering information is provided to the auxiliary decoder 215 for decompression employing previous frame Z-depth buffer information 216, which is provided from memory. This decompression produces decompressed current frame Z-depth buffer information 217.

A camera projection matrix portion of the compressed current additional rendering information along with the decompressed current frame Z-depth buffer information 217 are provided to the warping engine 220, which provides a warping transformation on a previous frame 211 to produce a reconstructed warped frame 225. The previous frame 211 is also provided from memory. The main decoder 210 employs the reconstructed warped frame 220 as a preferred reference frame for decoding the main video stream to provide the current frame 214.

In the illustrated embodiment, the main and auxiliary decoders 210, 215 are compliant with the H.264/AVC Video Coding Standard and may be portions of a same video decoder. Generally, embodiments of the present disclosure may accommodate frame decompression and hints decompression in other existing or future-developed video decoding structures wherein these decompression functions may be separate or combined.

Figure 3:
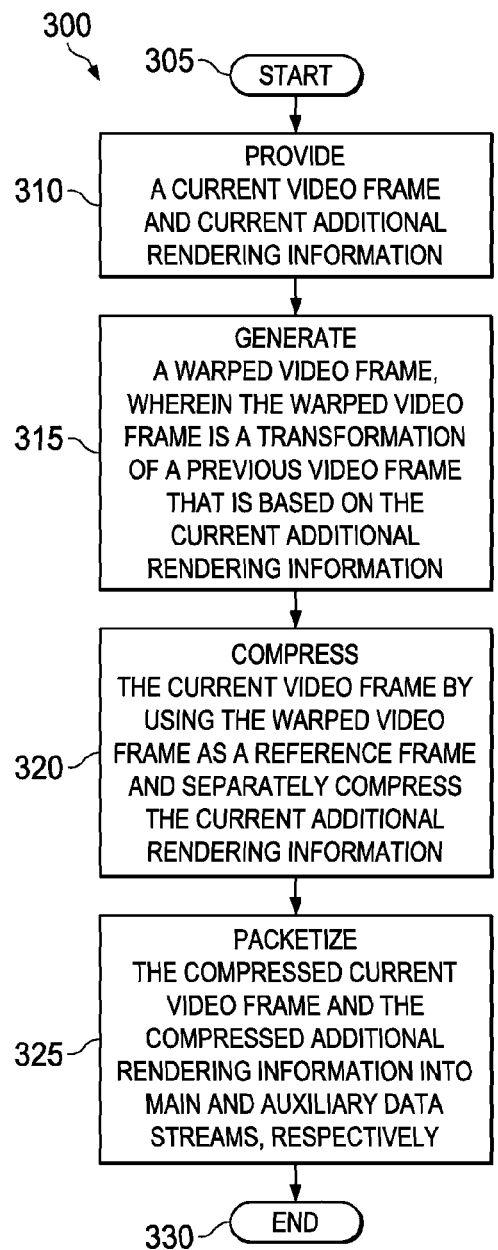
FIG. 3 illustrates a flow diagram of an embodiment of a method of video frame compression carried out according to the principles of the present disclosure.

FIG. 3 illustrates a flow diagram of an embodiment of a method of video frame compression, generally designated 300, carried out according to the principles of the present disclosure. The method 300 starts in a step 305, and a current video frame and current additional rendering information are provided in a step 310. Then, a warped video frame is generated in a frame 315, wherein the warped video frame is a transformation of a previous video frame that is based on the current additional rendering information. The current video frame is compressed by using the warped video frame as a reference frame and the current additional rendering information is separately compressed, in a step 320. The compressed current video frame and the compressed additional rendering information are packetized into main and auxiliary data streams, respectively, in a step 325.

In one embodiment, the current additional rendering information is selected from the group consisting of a camera projection matrix and a Z-depth buffer. In another embodiment, the current video frame and the current additional rendering information conform to the H.264/AVC Video Coding Standard. The method 300 ends in a step 330.

Figure 4:
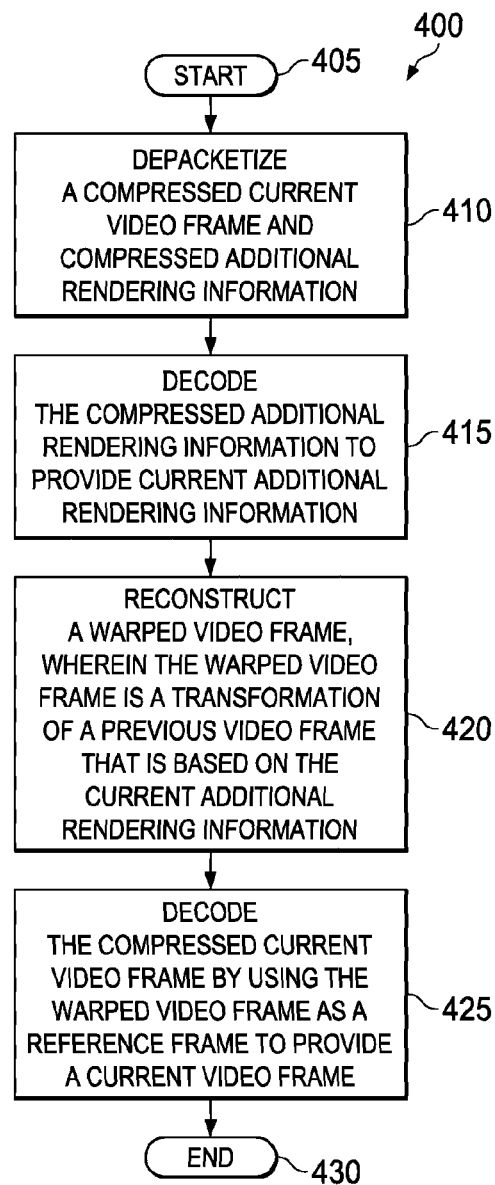
FIG. 4 illustrates a flow diagram of an embodiment of a method of video frame decompression carried out according to the principles of the present disclosure.

FIG. 4 illustrates a flow diagram of an embodiment of a method of video frame decompression, generally designated 400, carried out according to the principles of the present disclosure. The method 400 starts in a step 405, and a compressed current video frame and compressed additional rendering information are depacketized, in a step 410. Then, the compressed additional rendering information is decoded to provide current additional rendering information, in a step 415. A warped video frame is reconstructed in a step 420, wherein the warped video frame is a transformation of a previous video frame that is based on the current additional rendering information. The compressed current video frame is decoded by using the warped video frame as a reference frame to provide a current video frame, in a step 425.

In one embodiment, the current additional rendering information is provided by using previous additional rendering information as a reference. In another embodiment, the current additional rendering information is selected from the group consisting of a camera projection matrix and a Z-depth buffer. In yet another embodiment, the main and auxiliary video encoders conform to the H.264/AVC Video Coding Standard. The method 400 ends in a step 430.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A video frame compression system, comprising:
a rendering engine that provides a current video frame and current additional rendering information that differs from the current video frame;
a warping engine that generates a warped video frame, wherein the warped video frame is a transformation of a previous video frame that is based on the current additional rendering information; and
a video encoder that compresses the current video frame by using the warped video frame as a reference frame and separately compresses the current additional rendering information.

2. The system as recited in claim 1 further comprising a packetizer that provides main and auxiliary data streams corresponding to the compressed current video frame and the compressed current additional rendering information, respectively.

3. The system as recited in claim 1 wherein the current additional rendering information is selected from the group consisting of:
   a camera projection matrix; and
   a Z-depth buffer.

4. The system as recited in claim 1 wherein the video encoder conforms to the H.264/AVC Video Coding Standard.

5. A method of video frame compression, comprising:
   providing a current video frame and current additional rendering information that is different data than said current video frame;
   generating a warped video frame, wherein the warped video frame is a transformation of a previous video frame that is based on the current additional rendering information; and
   compressing the current video frame by using the warped video frame as a reference frame and separately compressing the current additional rendering information, wherein said generating and said compressing are performed by a processor.

6. The method as recited in claim 5 further comprising packetizing the compressed current video frame and the compressed additional rendering information into main and auxiliary data streams, respectively.

7. The method as recited in claim 5 wherein the current additional rendering information is selected from the group consisting of:
   a camera projection matrix; and
   a Z-depth buffer.

8. The method as recited in claim 5 wherein compressing the current video frame and the current additional rendering information conforms to the H.264/AVC Video Coding Standard.

9. A video frame decompression system, comprising:
   a depacketizer that provides a compressed current video frame and compressed additional rendering information;
   an auxiliary video decoder that decodes the compressed additional rendering information to provide current additional rendering information;
   a warping engine that reconstructs a warped video frame, wherein the warped video frame is a transformation of a previous video frame that is based on the current additional rendering information; and
   a main video decoder that decodes the compressed current video frame by using the warped video frame as a reference frame to provide a current video frame.

10. The system as recited in claim 9 wherein the main and auxiliary decoders are at least portions of a same decoder.

11. The system as recited in claim 9 wherein the current additional rendering information is provided by using previous additional rendering information as a reference.

12. The system as recited in claim 9 wherein the current additional rendering information is selected from the group consisting of:
    a camera projection matrix; and
    a Z-depth buffer.

13. The system as recited in claim 9 wherein the main and auxiliary video decoders conform to the H.264/AVC Video Coding Standard.

14. A method of video frame decompression, comprising:
    depacketizing a compressed current video frame and compressed additional rendering information;
    decoding the compressed additional rendering information to provide current additional rendering information;
    reconstructing a warped video frame, wherein the warped video frame is a transformation of a previous video frame that is based on the current additional rendering information; and
    decoding the compressed current video frame by using the warped video frame as a reference frame to provide a current video frame, wherein said depacketizing and said reconstructuring are performed by a processor.

15. The method as recited in claim 14 wherein the current additional rendering information is provided by using previous additional rendering information as a reference.

16. The method as recited in claim 14 wherein the current additional rendering information is selected from the group consisting of:
    a camera projection matrix; and
    a Z-depth buffer.

17. The method as recited in claim 14 wherein the main and auxiliary video encoders conform to the H.264/AVC Video Coding Standard.

* * * * *